(12) United States Patent
Feng et al.

(10) Patent No.: US 11,705,831 B2
(45) Date of Patent: Jul. 18, 2023

(54) ELECTRIC TOOL AND METHOD FOR CONTROLLING STARTUP THEREOF

(71) Applicant: Nanjing Chervon Industry Co., Ltd., Nanjing (CN)

(72) Inventors: Jifeng Feng, Nanjing (CN); Jian Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 276 days.

(21) Appl. No.: 17/342,752

(22) Filed: Jun. 9, 2021

(65) Prior Publication Data
US 2021/0394389 A1 Dec. 23, 2021

(30) Foreign Application Priority Data
Jun. 18, 2020 (CN) .......................... 202010558799.1

(51) Int. Cl.
| | |
|---|---|
| H02P 6/12 | (2006.01) |
| H02P 1/04 | (2006.01) |
| B27B 17/08 | (2006.01) |
| H02P 23/24 | (2016.01) |
| B27B 17/02 | (2006.01) |
| H02H 7/085 | (2006.01) |
| H02P 29/024 | (2016.01) |

(52) U.S. Cl.
CPC ................ H02P 1/04 (2013.01); B27B 17/02 (2013.01); B27B 17/083 (2013.01); H02H 7/0855 (2013.01); H02P 23/24 (2016.02); H02P 29/024 (2013.01)

(58) Field of Classification Search
CPC .......... H02P 1/04; H02P 23/24; H02P 29/024; H02P 1/028; H02P 1/029; H02H 7/0855
See application file for complete search history.

(56) References Cited

U.S. PATENT DOCUMENTS

2021/0044248 A1* 2/2021 Wang ........................ B25F 5/00

* cited by examiner

*Primary Examiner* — Muhammad S Islam
(74) *Attorney, Agent, or Firm* — Greenberg Traurig, LLP (57) ABSTRACT

An electric tool includes a drive structure, a motor, a driver circuit, and a controller. The controller is configured to output a first control signal to control the motor to drive the drive structure to operate in a first operation mode for a preset period of time in response to receiving a start instruction. After the preset period of time, the controller will output a second control signal to control the motor to drive the drive structure to operate in a second operation mode to a preset state. The first operation mode and the second operation mode are two opposite operation modes.

14 Claims, 7 Drawing Sheets

| In response to receiving a start instruction, a controller outputs a first control signal to control a motor to drive a drive structure in an electric tool to operate in a first operation mode for a preset period of time | S101 |

| After the preset period of time, the controller outputs a second control signal to control the motor to drive the drive structure to operate in a second operation mode to a preset state | S102 |

ELECTRIC TOOL AND METHOD FOR CONTROLLING STARTUP THEREOF

RELATED APPLICATION INFORMATION

This application claims the benefit under 35 U.S.C. § 119(a) of Chinese Patent Application No. CN 202010558799.1, filed on Jun. 18, 2020, which is incorporated by reference in its entirety herein.

BACKGROUND

Many electric tools, especially chain saws with a gear transmission mechanism, often need to be started with a load, or when chain saws are started again in case of a locked rotation, it is hoped that the starting ability of chain saws is stronger. However, for the existing chain saws, there is usually a problem of weak starting ability with load. In order to enhance the load-carrying startup capability of the gear transmission mechanism, generally used methods are to increase the number of gears, increase sizes of the gears, replace types of gears, or the like.

However, the hardware entity is changed such that the load-carrying startup capability of the gear transmission mechanism is enhanced. This mode increases the weight of the electric tool or changes the shape of the electric tool while increasing the cost of the hardware, thereby reducing the user experience.

SUMMARY

A chain saw includes: an output assembly including a chain and a guide plate; a transmission mechanism including a drive structure for outputting a driving force; a motor configured to rotate to drive the drive structure to operate; a driver circuit electrically connected to the motor to enable the motor to rotate; and a controller electrically connected to the driver circuit. The controller is configured to: in response to receiving a start instruction, output a first control signal to control the motor to drive the drive structure to operate in a first operation mode for a preset period of time; and after the preset period of time, output a second control signal to control the motor to drive the drive structure to operate in a second operation mode to a preset state. The first operation mode and the second operation mode are two opposite operation modes.

In one example, the transmission mechanism includes a drive gear and a driven gear, and the controller is configured to: in the preset period of time, output the first control signal to control the motor to drive the drive gear to rotate in a first rotation direction; and after the preset period of time, output the second control signal to control the motor to drive the drive gear to rotate in a second rotation direction to the preset state. The first rotation direction and the second rotation direction are two opposite directions.

In one example, the drive gear is configured to be driven by the first control signal to rotate by an acceleration distance based on the preset period of time.

In one example, the acceleration distance is within a range greater than or equal to zero and less than or equal to a tooth spacing between two teeth in the drive gear.

In one example, the controller is configured to output the first control signal having an adjustable duty cycle to control the motor in the preset period of time.

In one example, the controller is configured to: after the drive gear operates to the preset state, determine, according to any one or more parameters of a rotational speed of the motor or a current or a voltage loaded on the motor, whether a rotor of the motor is locked; in response to determining that the rotor of the motor is locked, output a third control signal to control the chain saw to stop operating; in response to receiving the start instruction, output the first control signal to control the motor to drive the drive gear to operate in the first operation mode for the preset period of time; and after the preset period of time, output the second control signal to control the motor to drive the drive gear to operate in the second operation mode to the preset state.

A method for controlling startup of an electric tool includes: in response to receiving a start instruction, outputting, by a controller, a first control signal to control a motor to drive a drive structure in the electric tool to operate in a first operation mode for a preset period of time; and after the preset period of time, outputting, by the controller, a second control signal to control the motor to drive the drive structure to operate in a second operation mode to a preset state. The first operation mode and the second operation mode are two opposite operation modes.

In one example, the drive structure is set as a tooth of a gear, and the method further includes: in the preset period of time, outputting, by the controller, the first control signal to control the motor to drive the gear to rotate in a first rotation direction; and after the preset period of time, outputting, by the controller, the second control signal to control the motor to drive the gear to rotate in a second rotation direction to the preset state. The first rotation direction and the second rotation direction are two opposite directions.

An electric tool includes a transmission mechanism including a drive structure for outputting a driving force; a motor configured to rotate to drive the drive structure to operate; a driver circuit electrically connected to the motor to enable the motor to rotate; and a controller electrically connected to the driver circuit. The controller is configured to: in response to receiving a start instruction, output a first control signal to control the motor to drive the drive structure to operate in a first operation mode for a preset period of time; and after the preset period of time, output a second control signal to control the motor to drive the drive structure to operate in a second operation mode to a preset state. The first operation mode and the second operation mode are two opposite operation modes.

In one example, the transmission mechanism includes a drive gear and a driven gear, and the controller is configured to: in the preset period of time, output the first control signal to control the motor to drive the drive gear to rotate in a first rotation direction; and after the preset period of time, output the second control signal to control the motor to drive the drive gear to rotate in a second rotation direction to the preset state. The first rotation direction and the second rotation direction are two opposite directions.

In one example, the drive gear is configured to be driven by the first control signal to rotate by an acceleration distance based on the preset period of time.

In one example, the acceleration distance is within a range greater than or equal to zero and less than or equal to a tooth spacing between two teeth in the drive gear.

In one example, the controller is configured to output the first control signal having an adjustable duty cycle to control the motor in the preset period of time.

In one example, the controller is configured to: after the drive gear operates to the preset state, determine, according to any one or more parameters of a rotational speed of the motor or a current or a voltage loaded on the motor, whether a rotor of the motor is locked; in response to determining that the rotor of the motor is locked, output a third control signal to control the electric tool to stop operating; in response to receiving the start instruction, output the first control signal to control the motor to drive the drive gear to operate in the first operation mode for the preset period of time; and after the preset period of time, output the second control signal to control the motor to drive the drive gear to operate in the second operation mode to the preset state.

DETAILED DESCRIPTION

Figure 1:
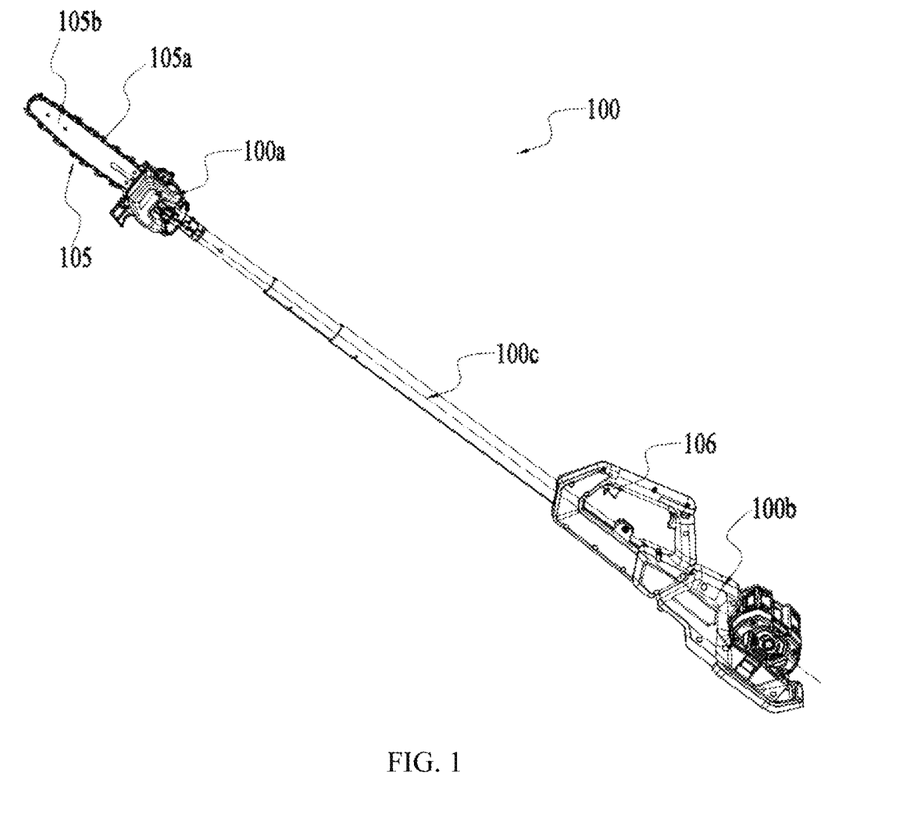
FIG. 1 is a structure diagram of an electric tool according to an example.
Figure 2:
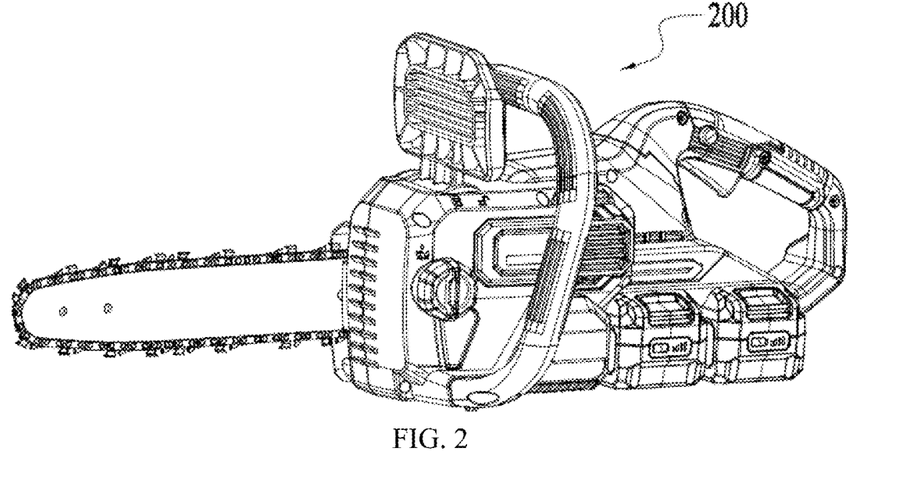
FIG. 2 is a structure diagram of an electric tool according to another example.
Figure 3:
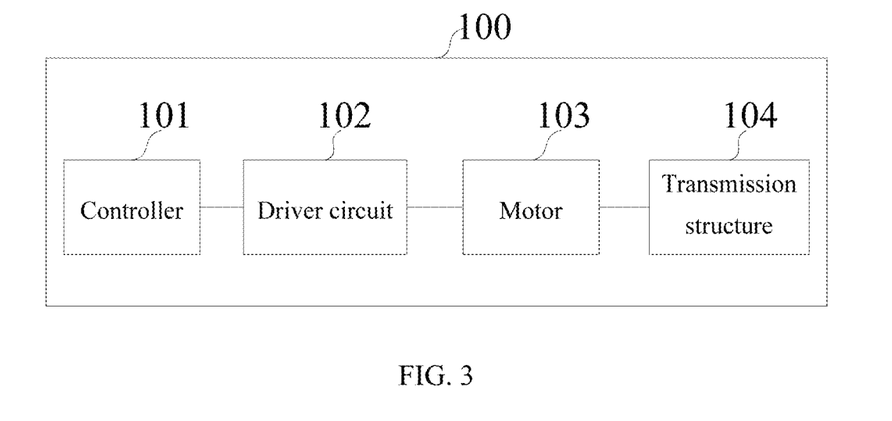
FIG. 3 is a logic diagram of the electric tool of FIG. 1.

In one example of the present application, there is provided an electric tool as shown in FIG. 1, which is a chain saw, and in this example, the chain saw is specifically a long rod chain saw 100. It will be appreciated that the chain saw may also be the hand-held chain saw 200 shown in FIG. 2. The long rod chain saw 100 includes a front end housing 100a, a rear end housing 100b, and a connecting rod 100c connecting the front end housing 100a and the rear end housing 100b. As shown in FIGS. 1 and 3, that long rod chain saw 100 further include a controller 101, a drive circuit 102, a motor 103, a transmission mechanism 104, and an output assembly 105. The output assembly 105 includes a chain 105a and a guide plate 105b, the guide plate 105b supporting the chain 105a.

In a specific implementation, the motor 103 rotates to drive the transmission mechanism 104 to operate.

The driver circuit 102 is electrically connected to the motor 103 to enable the motor 103 to rotate.

The controller 101 is electrically connected to the driver circuit 102 and configured to: in response to receiving a startup instruction, output a first control signal to control the motor 103 to drive the transmission structure 104 to operate in a first operation mode for a preset period of time.

Figure 5:
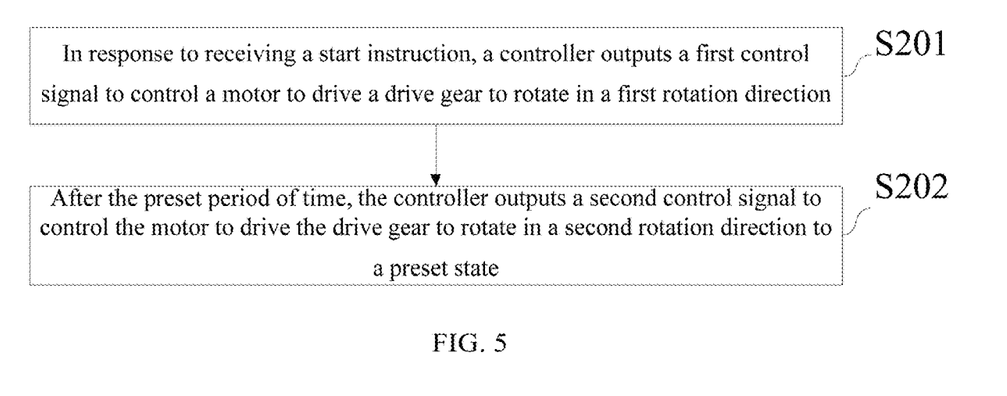
FIG. 5 is a flowchart of another method for controlling startup of the electric tools according to the examples of FIGS. 1 and 2.

The long rod chain saw 100 also includes a startup trigger 106. As shown in FIG. 5, the transmission mechanism 104 includes a drive gear 1 formed with a drive structure 104a for outputting a driving force to drive a driven gear 2. The controller 101 is configured to output a first control signal to control the motor 103 to drive the drive structure 104a to operate in the first operating mode for the preset period of time when receiving the startup instruction.

In a specific implementation, after a startup trigger 106 of the long rod chain saw 100 is pressed by an operator, the controller 101 can receive the start instruction of the long rod chain saw 100, and then the controller 101 can output the first control signal to control the long rod chain saw 100 to operate in the first operation mode for the preset period of time. In some examples, a value range of the preset period of time is 5 to 10 ms. The preset period of time may be a fixed period of time written in advance, such as 5 ms, 10 ms or other relatively small period of time. The preset period of time may also be written and updated by external devices such as mobile terminals such as mobile phones. It is to be noted that the long rod chain saw 100 is not actually started within the preset period of time, and it may be understood that the rotation of the motor 103 during the preset period of time is a pre-start before the long rod chain saw 100 normally starts. After a preset period of time, the controller 101 outputs a second control signal to control the motor 103 to drive the drive structure 104a to operate in the second operation mode to a preset state. The first operation mode of the drive structure 104a in the preset period of time and the second operation mode after the preset period of time are two opposite operation modes. For example, when the long rod chain saw 100 operates normally, the drive gear 1 rotates clockwise; and when the long rod chain saw 100 is started, the drive gear 1 rotates counterclockwise for a period of time (such as 5 ms) for pre-startup and then rotates clockwise to a preset state (such as reaching a preset rotational speed) so that the long rod chain saw 100 can operate normally. Thus, the counterclockwise rotation of the drive gear 1 is the first operation mode, and the clockwise rotation is the second operation mode.

The pre-startup is performed for the preset period of time such that the long rod chain saw 100 can acquire an acceleration parameter that is beneficial to enhancing a startup force. The acceleration parameter will increase a driving force of the drive structure 104a in the following normal startup stage, thereby improving the load-carrying startup force of the long rod chain saw 100. For example, during the 5 ms period of time for pre-startup, a center angle of the drive gear 1 which is driven by the chain saw to rotate counterclockwise is n, and a corresponding arc length L that the drive gear 1 rotates by during the preset period of time may be calculated according to the calculation formula of the arc length:

$$L = n \times \pi \times r / 180 \quad (1)$$

In some examples, the arc length L that the drive gear 1 rotates by during the preset period of time may be defined as the acceleration parameter. It is to be understood that in an example that the long rod chain saw 100 is started, in a process that the drive gear 1 clockwise rotates by the arc length L after the preset period of time of 5 ms, the long rod chain saw 100 is in an unloaded state, that is, the driven gear 2 is not driven to rotate, and the drive gear 1 obtains a larger startup force in the process so that in a process after the drive gear rotates by the arc length L, startup force the load-carrying startup capability of the chain saw is enhanced based on the above larger startup force.

In some examples, the acceleration parameter is defined as a length of arc, and in this case, the acceleration parameter may be referred to as an acceleration distance. In other feasible examples, the acceleration parameter may also be any parameter obtained to enhance the load-carrying startup capability.

In some examples, a duty cycle of the first control signal is adjustable and generally less than 8%.

It is to be understood that the preset state may be a state that the drive structure 104a reaches a certain rotational speed or a certain operating voltage or current, and the long rod chain saw 100 can normally operate in this state and may be unloaded or loaded. After the drive structure 104a reaches the preset state, startup of the long rod chain saw 100 is completed and the long rod chain saw 100 can normally operate.

In an optional example, during the normal operation of the long rod chain saw 100, it is determined that a rotor of the tool is locked if the controller 101 detects that the rotational speed of the motor 103 103 is less than a given threshold or a back electromotive force is not commutated; and the controller 101 outputs a third control signal to control the tool to stop when the rotor of the tool is locked. When a user releases the trigger and then presses the trigger again, that is, the user restarts the tool, the controller 101 can receive the start instruction again, output, according to the start instruction, the first control signal to control the long rod chain saw 100 to perform the pre-startup as described above, and output the second control signal to control the drive structure 104a to operate in the second operation mode to the preset state after the preset period of time.

It is to be understood that in addition to the above-mentioned structural components, the long rod chain saw 100 further includes other accessories such as a battery pack, a housing, a drill head or a handle. Since other accessories are not directly involved in the process of startup control of the long rod chain saw 100, the other accessories will not be described in detail in the present disclosure.

In the example of the present disclosure, the controller 101 controls the motor 103 to perform the reversing rotation for the preset period of time before the long rod chain saw 100 is officially started. In this manner, the acceleration parameter of the drive structure 104a before normal startup is acquired, and the startup in the normal startup stage is performed based on the acceleration parameter, thereby increasing the load-carrying startup capability during normal startup.

Figure 4:
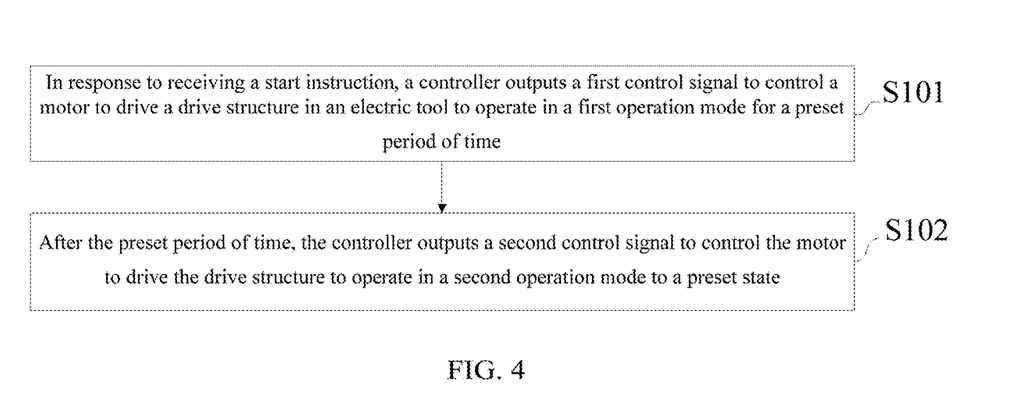
FIG. 4 is a flowchart of a method for controlling startup of the electric tools according to the examples of FIGS. 1 and 2.

Referring to FIG. 4, a method for controlling startup of the long rod chain saw 100 may include at least steps described below.

In S101, in response to receiving the start instruction, the controller 101 outputs the first control signal to control the motor 103 to drive the drive structure 104a in the long rod chain saw 100 to operate in the first operation mode for the preset period of time.

In the preset period of time, the first control signal output by the controller 101 controls the motor 103 to drive the drive gear 1 to rotate in a first rotation direction. The duty cycle of the first control signal is adjustable, and a value is generally less than 8%.

In S102, after the preset period of time, the controller outputs the second control signal to control the motor 103 to drive the drive structure 104a to operate in the second operation mode to the preset state.

In one example, the second control signal output by the controller 101 controls the motor 103 to drive the drive gear 1 to rotate in a second rotation direction. The first rotation direction and the second rotation direction are two opposite directions.

In some examples, the drive gear 1 is driven by the first control signal to rotate by the acceleration distance L within the preset period of time, and L is within a range greater than or equal to zero and less than or equal to a tooth spacing between two teeth in the drive gear 1.

It is to be understood that the above-mentioned preset state may be a state that the drive structure 104a reaches a certain rotational speed or a certain operating voltage or current, and the long rod chain saw 100 in this state may be unloaded or loaded. After the drive structure 104a reaches the preset state, the startup of the long rod chain saw 100 is completed and the long rod chain saw 100 can normally operate.

In some examples, during normal operation of the long rod chain saw 100, the controller 101 can determine, according to any one or more parameters of the rotational speed of the motor 103 or a current or a voltage loaded on the motor 103, whether a rotor of the motor 103 is locked, and if it is detected that the rotor of the motor 103 is detected, a third control signal is output to control the long rod chain saw 100 to stop operating; and only when it is detected that the long rod chain saw 100 is started again, that is, the start instruction is received again will the controller 1 output the first control signal again to control the motor 103 to drive the drive gear 1 to operate in the first operation mode for the preset period of time and output the second control signal to control the motor 103 to drive the drive gear 1 to operate in the second operation mode to the preset state after the preset period of time.

It is to be noted that for a startup control process for the method for controlling startup of the long rod chain saw 100 in this example, reference may be made to the description of the long rod chain saw 100 and the startup process thereof in example one. Details will not be repeated here.

Referring to FIG. 5, another method for controlling startup of the long rod chain saw 100 may include at least steps described below.

In S201, in response to receiving a start instruction, the controller 101 outputs a first control signal to control the motor 103 to drive the drive gear 1 to rotate in a first rotation direction.

In S202, after the preset period of time, the controller 101 outputs a second control signal to control the motor 103 to drive the drive gear 1 to rotate in a second rotation direction to a preset state.

Figure 6:
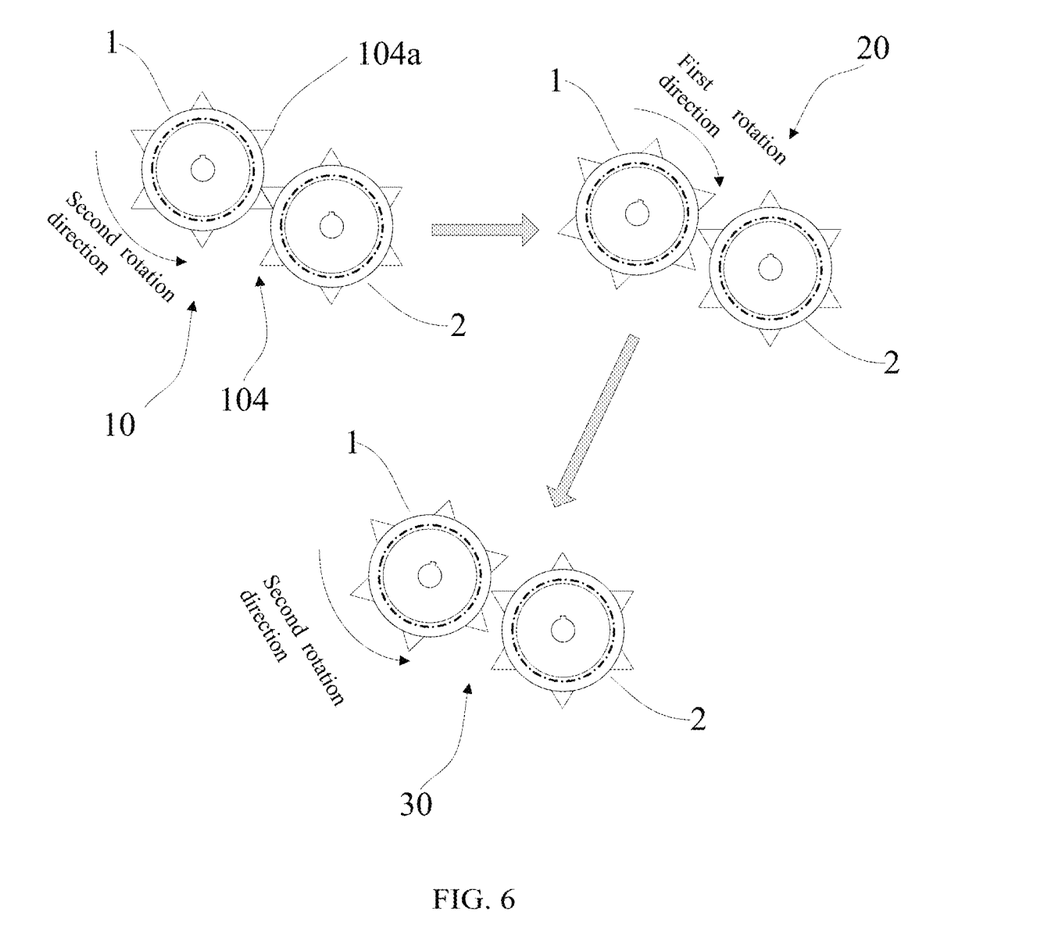
FIG. 6 is a schematic diagram of relative states of a drive gear and a driven gear from before startup of the electric tool to normal startup of the electric tool of FIG. 1.

FIG. 6 illustrates relative states of the drive gear and the driven gear of the electric tool in three stages. The three stages include a before-startup stage 10, a pre-startup stage 20 and a normal-startup stage 30.

Figure 7A:
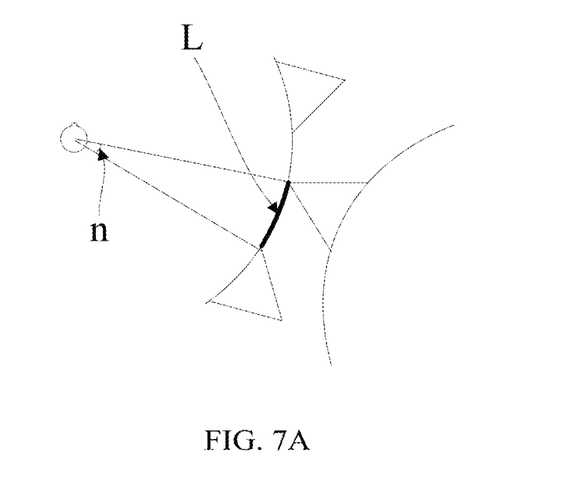
FIGS. 7A to 7B are schematic diagrams of an acceleration distance and a tooth spacing of FIG. 1.

It is firstly to be noted that in the example shown in FIG. 6, the drive gear 1 rotates counterclockwise in the above-mentioned second rotation direction and rotates clockwise in the above-mentioned first rotation direction. In particular, the drive gear 1 and the driven gear 2 are tightly engaged in the before-startup stage 10, and if the drive gear 1 immediately performs the reversing drive, the startup ability of the tool will be poor. Furthermore, the controller 101 outputs the first control signal with an adjustable duty cycle in the pre-startup stage 20 to control the drive gear 1 to firstly rotate in the first rotation direction, that is, the clockwise direction, for the preset period of time (such as 5 ms). In this manner, the drive gear 1 and the driven gear 2 are spaced by a certain distance, and the distance is the arc length L on the drive gear 1 (an arc length in bold shown in FIG. 7A) and also referred to as the acceleration distance by which the drive gear 1 rotates within the preset period of time. It is to be noted that the influence on the load of the long rod chain saw 100 when the drive gear 1 firstly rotates clockwise for the preset period of time at the pre-startup 20 stage is negligible no matter whether the drive gear 1 and the driven gear 2 are tightly engaged in an initial state, that is, at the before-startup stage 10 pre-startup. Therefore, the controller 101 needs to firstly output the first control signal to control the drive gear 1 to rotate in the first rotation direction for the preset period of time to perform the pre-startup no matter whether the drive gear 1 and the driven gear 2 are tightly engaged at the before-startup stage 10. Furthermore, at the normal-startup stage 30, the drive gear 1 rotates in the second rotation direction, that is, counterclockwise, on the basis of the acceleration distance L to the preset state, that is, a state that the rotational speed of the drive gear 1, the voltage or the current can satisfy the normal operation of the long rod chain saw 100, and in this state, the long rod chain saw 100 may be unloaded or loaded.

Figure 7B:
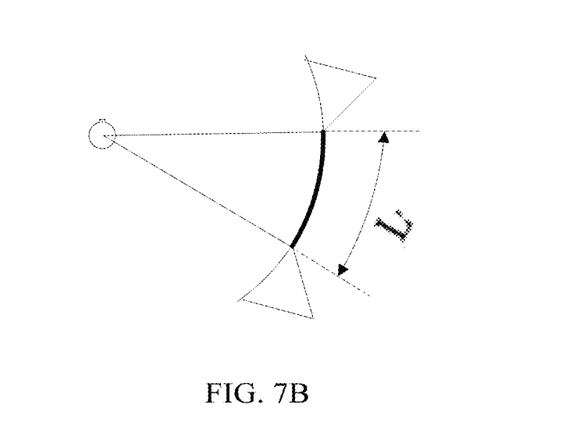

It is to be understood that the acceleration distance L may be a minimum of zero and a maximum of not exceeding the tooth spacing L' between two teeth in the drive gear 1, that is, the arc length in bold shown in FIG. 7B.

Figure 8A:
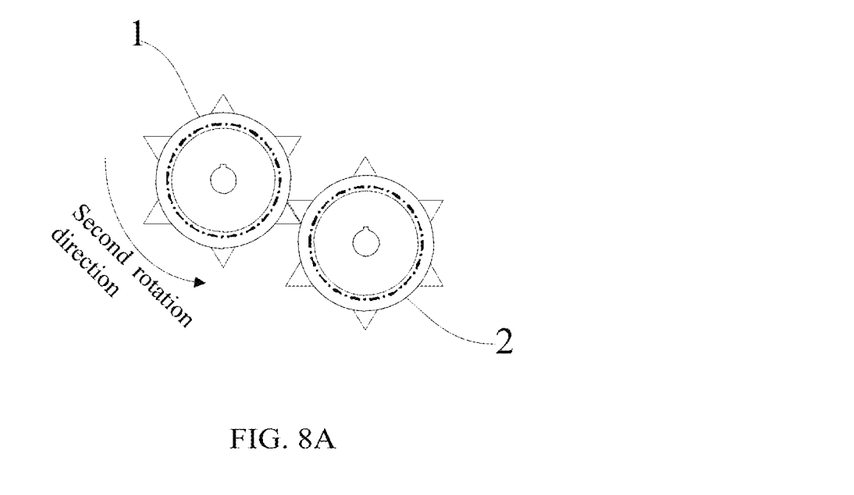
FIGS. 8A to 8B are schematic diagrams illustrating two states in which teeth are tightly engaged with each other of FIG. 1.
Figure 8B:
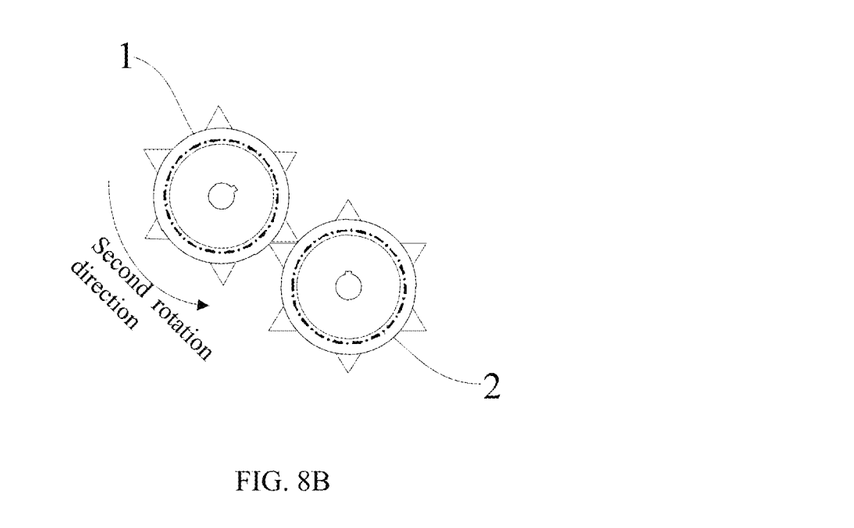

In one state, the acceleration distance L may be the minimum of zero. For example, the drive gear 1 and the driven gear 2 are tightly engaged in a state shown in FIG. 8A. If the drive gear 1 does not rotate within the preset period of time or rotates in too small a preset period of time to generate a rotation distance, the acceleration distance L when the drive gear 1 is rotatably started in the second rotation direction is zero. In another state, the acceleration distance L does not exceed the tooth spacing L' between two teeth in the gear at most. When the electric tool has the maximum acceleration distance, the drive gear 1 and the driven gear 2 are tightly engaged in a state shown in FIG. 8B (this state may be the initial state of the gears before the long rod chain saw 100 is started or a state that the drive gear 1 has rotated for the preset period of time), and at this time, the acceleration distance L when the drive gear 1 rotates in the second rotation direction is L'. Of course, after the preset period of time, if the drive gear 1 and the driven gear 2 are in a state between the above-mentioned tight engagement states, the acceleration distance L is greater than zero and less than L'. In addition, since different long rod chain saws 100 have different types of gears, corresponding tooth spacings are also different, but the tooth spacing L' in the same long rod chain saw 100 is a fixed value.

In the example of the present disclosure, due to the existence of the acceleration distance L, the drive gear 1 can generate a relatively strong startup force based on the acceleration distance L during normal startup, thereby enhancing the load-carrying startup capability of the gear transmission.

It is to be noted that the duty cycle of the first control signal is adjustable and generally less than 8%. The reversing pre-startup requirements of different long rod chain saws 100 under different startup scenarios are satisfied through the first control signal with the adjustable duty cycle, and the flexibility of pre-startup control is increased.

In an optional example, during the startup and the normal operation of the long rod chain saw 100, it is determined that the rotor of the long rod chain saw 100 is locked if the controller 101 detects that the rotational speed of the motor 103 is less than the given threshold or the back electromotive force is not commutated; and the controller 101 outputs the third control signal to control the long rod chain saw 100 to stop when the rotor of the long rod chain saw 100 is locked. When it is detected that the user releases the trigger and then presses the trigger again, that is, the user restarts the long rod chain saw 100, the controller 101 receives the start instruction again and can output the first control signal again to perform the pre-startup as described above, and the controller 101 can output the second control signal to control the drive gear 1 to rotate in the second rotation direction to the preset state after the preset period of time.

In the example of the present disclosure, the controller 101 controls the motor 103 to perform the reversing rotation for the preset period of time before the long rod chain saw 100 is officially started. In this manner, the acceleration distance of the drive structure 104a before the normal startup is acquired, and the startup in the normal startup stage is performed based on the acceleration distance, thereby increasing the load-carrying startup capability during normal startup.

It is to be noted that the above are merely preferred examples of the present disclosure and the technical principles used therein. It will be understood by those skilled in the art that the present disclosure is not limited to the specific examples described herein. Those skilled in the art can make various apparent modifications, adaptations and substitutions without departing from the scope of the present disclosure. Therefore, while the present disclosure has been described in detail through the preceding examples, the present disclosure is not limited to the preceding examples and may further include more other equivalent examples without departing from the concept of the present disclosure. The scope of the present disclosure is determined by the scope of the appended claims.

What is claimed is:

1. A chain saw, comprising:
   an output assembly comprising a chain and a guide plate;
   a transmission mechanism comprising a drive structure for outputting a driving force;
   a motor configured to rotate to drive the drive structure to operate;
   a driver circuit electrically connected to the motor to enable the motor to rotate; and
   a controller electrically connected to the driver circuit;
   wherein the controller is configured to respond to receiving a start instruction by outputting a first control signal to control the motor to drive the drive structure to operate in a first operation mode for a preset period of time; and
   after the preset period of time, output a second control signal to control the motor to drive the drive structure to operate in a second operation mode to a preset state;
   wherein the first operation mode and the second operation mode are two opposite operation modes.

2. The chain saw of claim 1, wherein the transmission mechanism comprises a drive gear and a driven gear and the controller is configured to output the first control signal to control the motor to drive the drive gear to rotate in a first rotation direction during the preset period of time and output the second control signal to control the motor to drive the drive gear to rotate in a second rotation direction, opposite to the first rotation direction, to the preset state after the preset period of time.

3. The chain saw of claim 2, wherein the drive gear is configured to be driven by the first control signal to rotate by an acceleration distance based on the preset period of time.

4. The chain saw of claim 3, wherein the acceleration distance is within a range greater than or equal to zero and less than or equal to a tooth spacing between two teeth in the drive gear.

5. The chain saw of claim 1, wherein the first control signal has an adjustable duty cycle to control the motor during the preset period of time.

6. The chain saw of claim 2, wherein the controller is configured to determine, according to any one or more parameters of a rotational speed of the motor or a current or a voltage loaded on the motor, whether a rotor of the motor is locked after the drive gear is rotated to the preset state, respond to determining that the rotor of the motor is locked by outputting a third control signal to control the chain saw to stop operating, respond to receiving the start instruction by outputting the first control signal to control the motor to drive the drive gear to operate in the first operation mode for the preset period of time and, after the preset period of time, output the second control signal to control the motor to drive the drive gear to operate in the second operation mode to the preset state.

7. A method for controlling startup of an electric tool, comprising:
outputting, by a controller, a first control signal to control a motor to drive a drive structure in the electric tool to operate in a first operation mode for a preset period of time in response to receiving a start instruction; and
after the preset period of time, outputting, by the controller, a second control signal to control the motor to drive the drive structure to operate in a second operation mode to a preset state;
wherein the first operation mode and the second operation mode are two opposite operation modes.

8. The method of claim 7, wherein the drive structure is set as a tooth of a gear, and the method further comprises outputting, by the controller, the first control signal to control the motor to drive the gear to rotate in a first rotation direction during the preset period of time and, after the preset period of time, outputting, by the controller, the second control signal to control the motor to drive the gear to rotate in a second rotation direction, opposite to the first rotation direction, to the preset state.

9. An electric tool, comprising:
a transmission mechanism comprising a drive structure for outputting a driving force;
a motor configured to rotate to drive the drive structure to operate;
a driver circuit electrically connected to the motor to enable the motor to rotate; and
a controller electrically connected to the driver circuit;
wherein the controller is configured to respond to receiving a start instruction by outputting a first control signal to control the motor to drive the drive structure to operate in a first operation mode for a preset period of time; and
after the preset period of time, output a second control signal to control the motor to drive the drive structure to operate in a second operation mode to a preset state;
wherein the first operation mode and the second operation mode are two opposite operation modes.

10. The electric tool of claim 9, wherein the transmission mechanism comprises a drive gear and a driven gear, and the controller is configured to output the first control signal to control the motor to drive the drive gear to rotate in a first rotation direction during the preset period of time and, after the preset period of time, output the second control signal to control the motor to drive the drive gear to rotate in a second rotation direction, opposite to the first rotation direction, to the preset state.

11. The electric tool of claim 10, wherein the drive gear is configured to be driven by the first control signal to rotate by an acceleration distance based on the preset period of time.

12. The electric tool of claim 11, wherein the acceleration distance is within a range greater than or equal to zero and less than or equal to a tooth spacing between two teeth in the drive gear.

13. The electric tool of claim 1, wherein the controller is configured to output the first control signal having an adjustable duty cycle to control the motor in the preset period of time.

14. The electric tool of claim 10, wherein the controller is configured to, after the drive gear operates to the preset state, determine, according to any one or more parameters of a rotational speed of the motor or a current or a voltage loaded on the motor, whether a rotor of the motor is locked, respond to determining that the rotor of the motor is locked by outputting a third control signal to control the electric tool to stop operating, respond to receiving the start instruction by outputting the first control signal to control the motor to drive the drive gear to operate in the first operation mode for the preset period of time, and, after the preset period of time, output the second control signal to control the motor to drive the drive gear to operate in the second operation mode to the preset state.

* * * * *